(12) United States Patent  (10) Patent No.: US 6,979,229 B1
Liao et al.  (45) Date of Patent: Dec. 27, 2005

(54) ELECTRICAL CONNECTOR ASSEMBLY FOR A VEHICLE

(75) Inventors: Feng-Huei Liao, Tainan (TW); Samuel Lin, Chia Yi Hsien (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 0 days.

(21) Appl. No.: 11/166,614

(22) Filed: Jun. 24, 2005

(51) Int. Cl.$^7$ ............................................... H01R 24/00
(52) U.S. Cl. ..................................... 439/660; 439/822
(58) Field of Search ............................... 439/500, 660, 439/729, 819, 822, 34

(56) References Cited

U.S. PATENT DOCUMENTS

| | | | | |
|---|---|---|---|---|
| 5,209,679 A | * | 5/1993 | Quinlan ...................... | 439/822 |
| 5,551,883 A | * | 9/1996 | Davis .......................... | 439/65 |
| 5,634,821 A | * | 6/1997 | Crane, Jr. ................... | 439/660 |
| 5,795,183 A | * | 8/1998 | Kameyama ................. | 439/534 |
| 5,833,049 A | * | 11/1998 | Yamashita et al. .......... | 200/284 |
| 6,116,956 A | * | 9/2000 | Wu ............................. | 439/626 |
| 6,887,113 B1 | * | 5/2005 | Langheinrich .............. | 439/822 |

* cited by examiner

Primary Examiner—Khiem Nguyen
(74) Attorney, Agent, or Firm—McNees Wallace & Nurick LLC (57) ABSTRACT

An electrical connector assembly is adapted for interconnecting first and second conductors provided respectively on first and second vehicle components that are coupled removably to each other, and includes first and second electrical connectors. The first electrical connector includes a first insulator seat to be mounted on the first vehicle component, and a plurality of first contacts mounted on the first insulator seat and to be coupled electrically and respectively to the first conductors. The second electrical connector includes a second insulator seat to be mounted on the second vehicle component, and a plurality of second contacts mounted pivotally on the second insulator seat and to be coupled electrically and respectively to the second conductors. The second contacts are biased such that, when the first and second vehicle components are coupled together, the second contacts are able to establish tight electrical contact with the first contacts, respectively.

8 Claims, 9 Drawing Sheets

ELECTRICAL CONNECTOR ASSEMBLY FOR A VEHICLE

BACKGROUND OF THE INVENTION

1. Field of the Invention

The invention relates to an electrical connector assembly for a vehicle, more particularly to an electrical connector assembly adapted for interconnecting first and second conductors provided respectively on first and second vehicle components that are coupled removably to each other.

2. Description of the Related Art

A conventional motor-driven vehicle for the elderly and the disabled is provided with electromotive equipment on a vehicle chassis thereof. To facilitate transport and storage, the vehicle chassis is usually built as front and rear chassis parts that are coupled removably to each other. The electromotive equipment generally includes a battery unit mounted on the rear chassis part, and a controller mounted on the front chassis part. Due to the removable coupling between the front and rear chassis parts, an electrical connector assembly is required to establish electrical connection between the battery unit and the controller when the front and rear chassis parts are coupled together.

Figure 1:
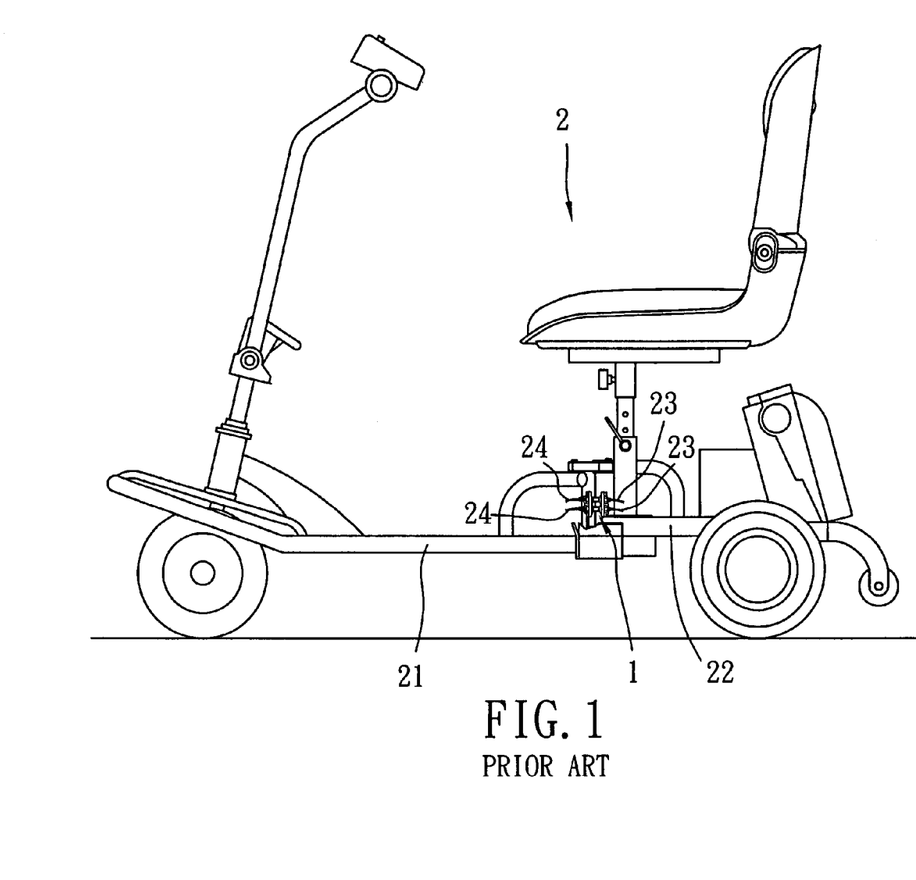
FIG. 1 is a schematic side view of a motor-driven vehicle that incorporates a conventional electrical connector assembly.
Figure 2:
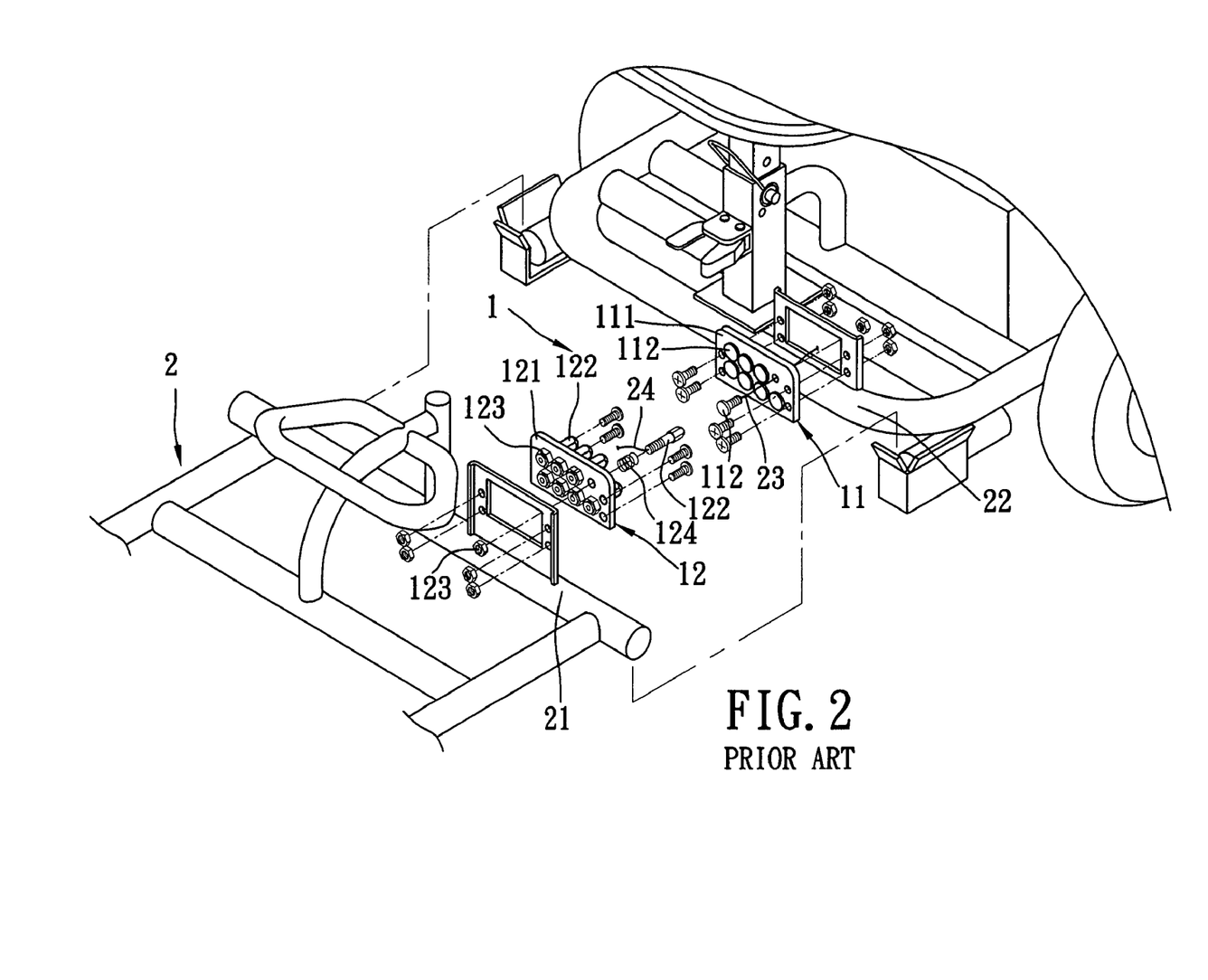
FIG. 2 is a fragmentary exploded perspective view to illustrate the conventional electrical connector assembly in greater detail.
Figure 3:
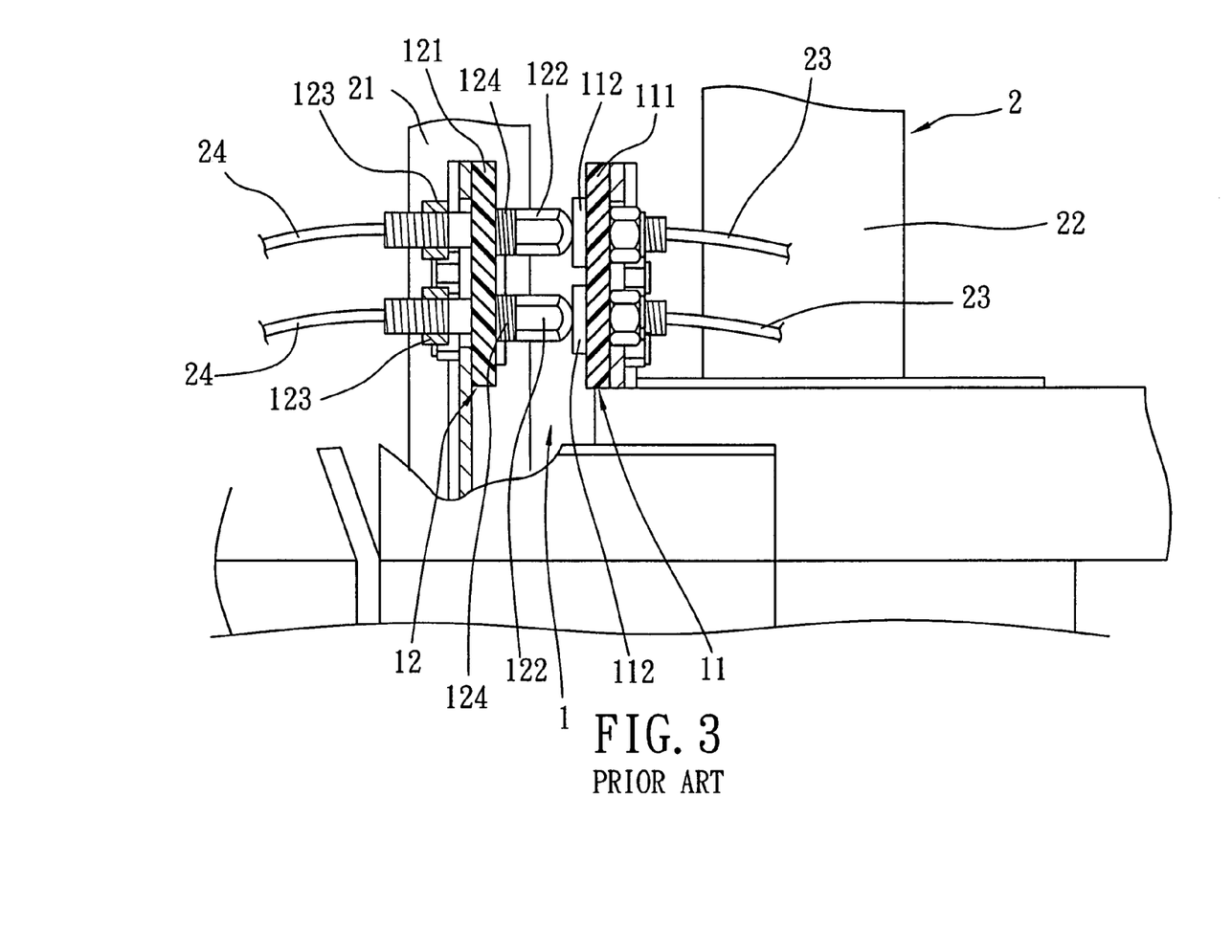
FIG. 3 is a fragmentary schematic partly sectional view to illustrate the conventional electrical connector assembly in a connection-making state.

FIGS. 1 to 3 illustrate a conventional electrical connector assembly 1 for a motor-driven vehicle 2 that includes front and rear chassis parts 21, 22. The electrical connector assembly 1 includes a first electrical connector 11 and a second electrical connector 12. The first electrical connector 11 includes an upright first insulator seat 111 mounted on the rear chassis part 22, and a plurality of first contacts 112 mounted on the first insulator seat 111 and spaced apart from each other. Each of the first contacts 112 is in the form of a flat-head screw fastener, and has a distal end coupled electrically to a respective conductor 23. The second electrical connector 12 includes an upright second insulator seat 121 mounted on the front chassis part 21 at a position corresponding to that of the first insulator seat 111 on the rear chassis part 22, a plurality of second contacts 122 extending movably through the second insulator seat 121 and spaced apart from each other, a plurality of limit members 123 secured respectively to distal ends of the second contacts 122 for retaining movably the second contacts 122 on the second insulator seat 121, and a plurality of compression springs 124 sleeved respectively on the second contacts 122 for urging the second contacts 122 away from the second insulator seat 121. The distal end of each of the second contacts 122, which are in the form of headed screw fasteners, is coupled electrically to a respective conductor 24.

When the front and rear chassis parts 21, 22 are coupled together, the first and second electrical connectors 11, 12 are brought toward each other such that the second contacts 122 are registered with the first contacts 112, respectively. Due to the biasing action of the compression springs 124, the second contacts 122 are urged to contact tightly the first contacts 112 so as to establish electrical connection between the conductors 24, 23 on the front and rear chassis parts 21, 22. On the other hand, when the front and rear chassis part 21, 22 are disassembled, the first and second electrical connectors 11, 12 are moved away from each other, thereby breaking the electrical connection between the conductors 23, 24.

SUMMARY OF THE INVENTION

The object of the present invention is to provide an alternative design of an electrical connector assembly, which is adapted for interconnecting first and second conductors provided respectively on first and second vehicle components that are coupled removably to each other.

According to the present invention, an electrical connector assembly is adapted for a vehicle that includes a first component and a second component coupled removably to the first component. The first component is provided with a plurality of first conductors. The second component is provided with a plurality of second conductors. The electrical connector assembly is adapted to interconnect electrically the first and second conductors when the first component is coupled to the second component. The electrical connector assembly comprises first and second electrical connectors.

The first electrical connector includes a first insulator seat adapted to be mounted on the first component, and a plurality of first contacts mounted on the first insulator seat and spaced apart from each other. The first contacts are adapted to be coupled electrically and respectively to the first conductors.

The second electrical connector includes a second insulator seat adapted to be mounted on the second component at a position corresponding to that of the first insulator seat on the first component, and a plurality of second contacts mounted pivotally on the second insulator seat and spaced apart from each other. The second contacts are adapted to be coupled electrically and respectively to the second conductors.

The second contacts are registered with and contact electrically and respectively the first contacts so as to establish electrical connection between the first and second conductors when the first and second components are coupled together.

The second electrical connector further includes a biasing unit for urging the second contacts to pivot in order to establish tight contact with the first contacts when the first and second components are coupled together.

The second contacts are moved away from the first contacts so as to break electrical connection between the first and second conductors when the second component is removed from the first component.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
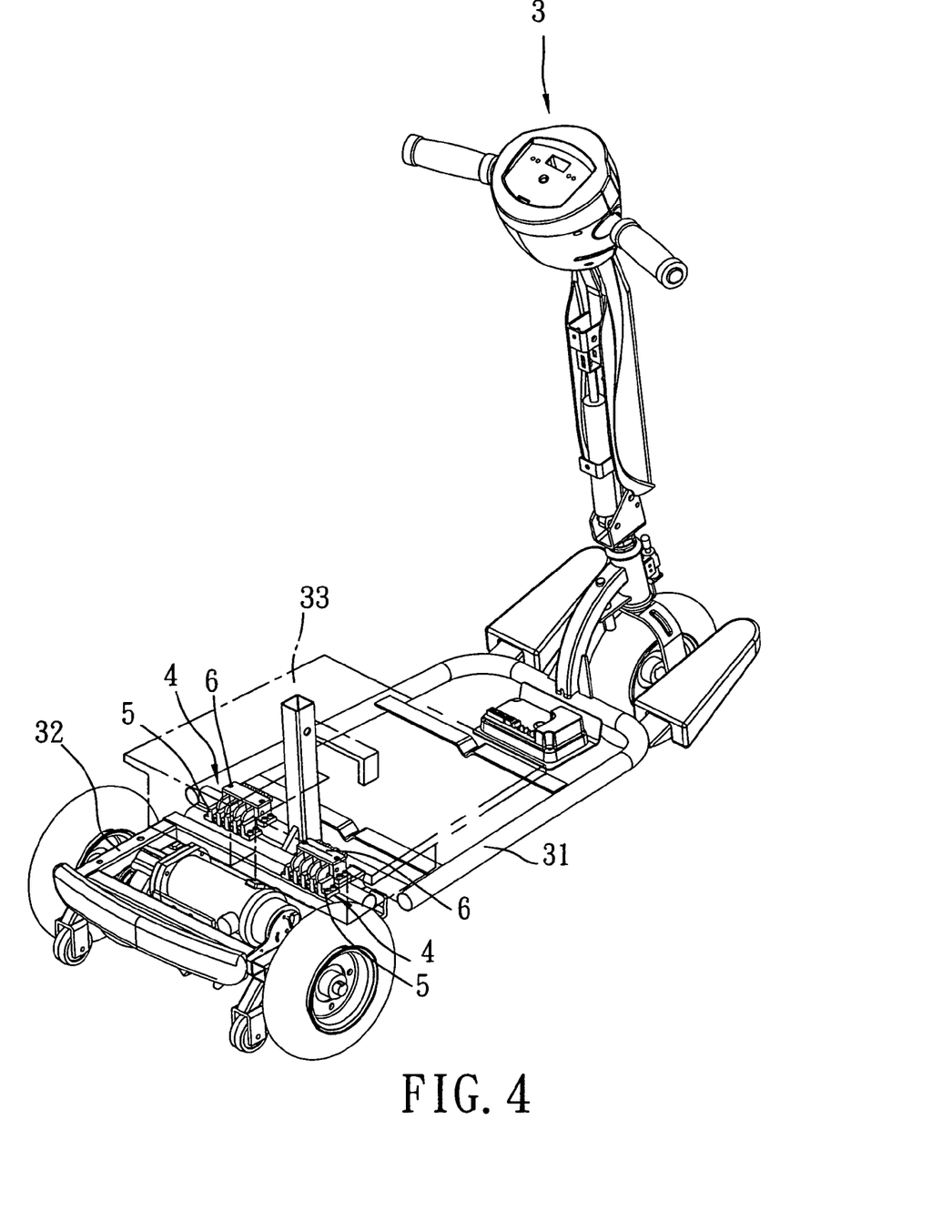
FIG. 4 is a perspective view of a motor-driven vehicle that incorporates the preferred embodiment of an electrical connector assembly according to the present invention.
Figure 5:
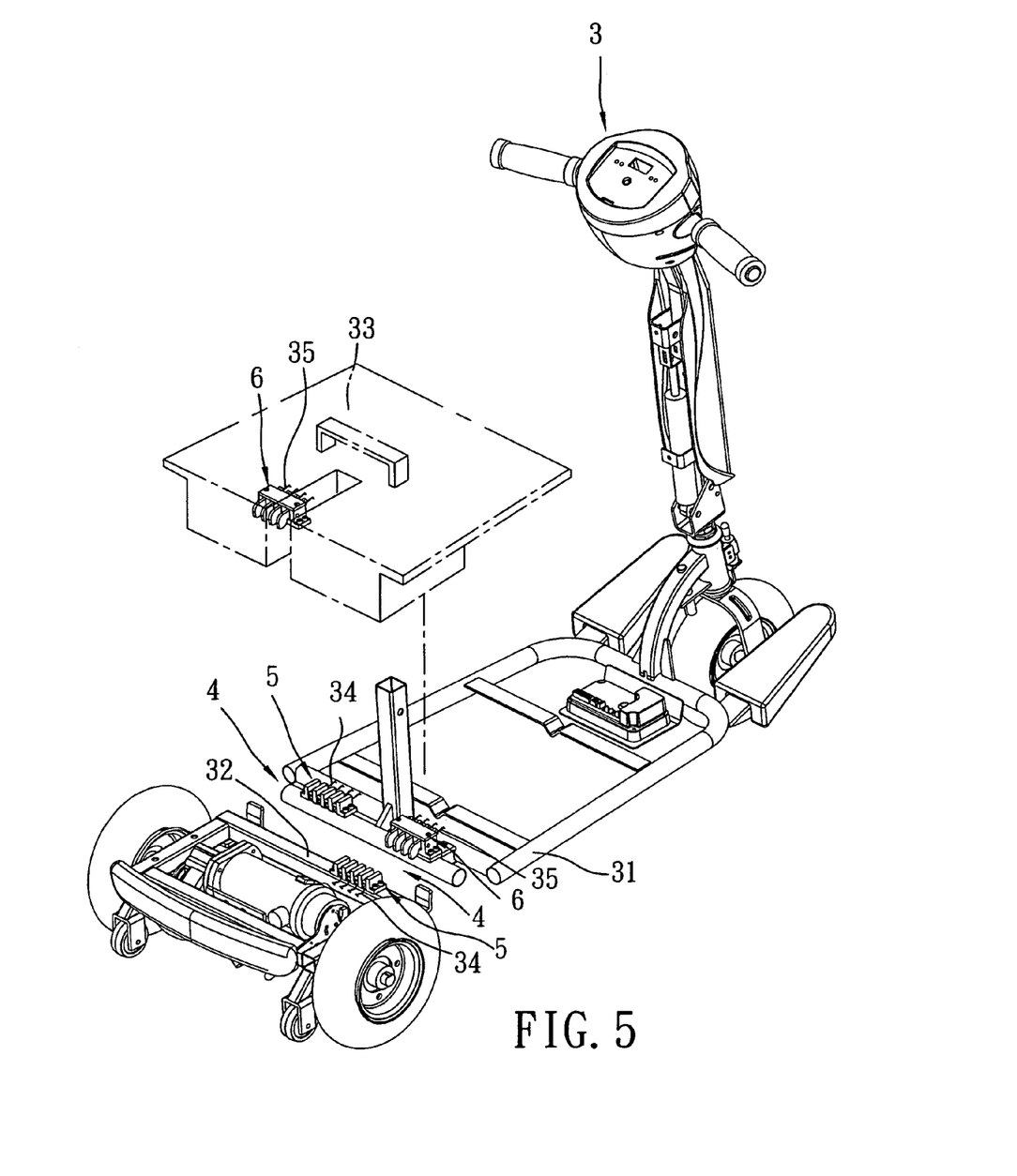
FIG. 5 is a perspective view similar to FIG. 4, but illustrating a detached state of front and rear chassis parts and a battery unit of the motor-driven vehicle.

Referring to FIGS. 4 and 5, the preferred embodiment of an electrical connector assembly 4 according to the present invention is shown applied to a vehicle 3. In this embodiment, the vehicle 3 is a motor-driven vehicle, and includes a front chassis part 31, a rear chassis part 32 coupled removably to a rear end of the front chassis part 31, and a battery unit 33 coupled removably to an upper rear side of the front chassis part 31. The electrical connector assembly 4 of the preferred embodiment is adapted for mounting between the front and rear chassis parts 31, 32, or between the front chassis part 31 and the battery unit 33. Therefore, in this embodiment, the rear chassis part 32 and the front chassis part 31 can serve as first and second components of the vehicle 3, respectively. Alternatively, the front chassis part 31 and the battery unit 33 can serve as first and second components of the vehicle 3, respectively. Moreover, a plurality of first conductors 34 is provided on the first component (i.e., the rear chassis part 32 or the front chassis part 31) of the vehicle 3. In addition, a plurality of second conductors 35 is provided on the second component (i.e., the front chassis part 31 or the battery unit 33) of the vehicle 3. The electrical connector assembly 4 is adapted to interconnect electrically the first and second conductors 34, 35 when the first component is coupled to the second component.

The following description focuses primarily on the structure of the electrical connector assembly 4. Since the present invention is not directed to the structural connection between the first and second components of the vehicle 3 and the functions associated with the first and second conductors 34, 35, a description of the same will be omitted herein. In practice, the electrical connector assembly 4 may be applied to other removably interconnected parts of the motor-driven vehicle 3, or to other types of vehicles. Hence, the positions and orientations of the elements of the electrical connector assembly 4 should not be limited to those of the preferred embodiment disclosed herein. In the following description, the preferred embodiment is illustrated with the rear chassis part 32 serving as the first component of the vehicle 3, and the front chassis part 31 serving as the second component of the vehicle 3. Therefore, FIG. 4 illustrates a state where the first and second components 32, 31 are coupled together, whereas FIG. 5 illustrates a state where the second component 31 is removed from the first component 32.

Figure 6:
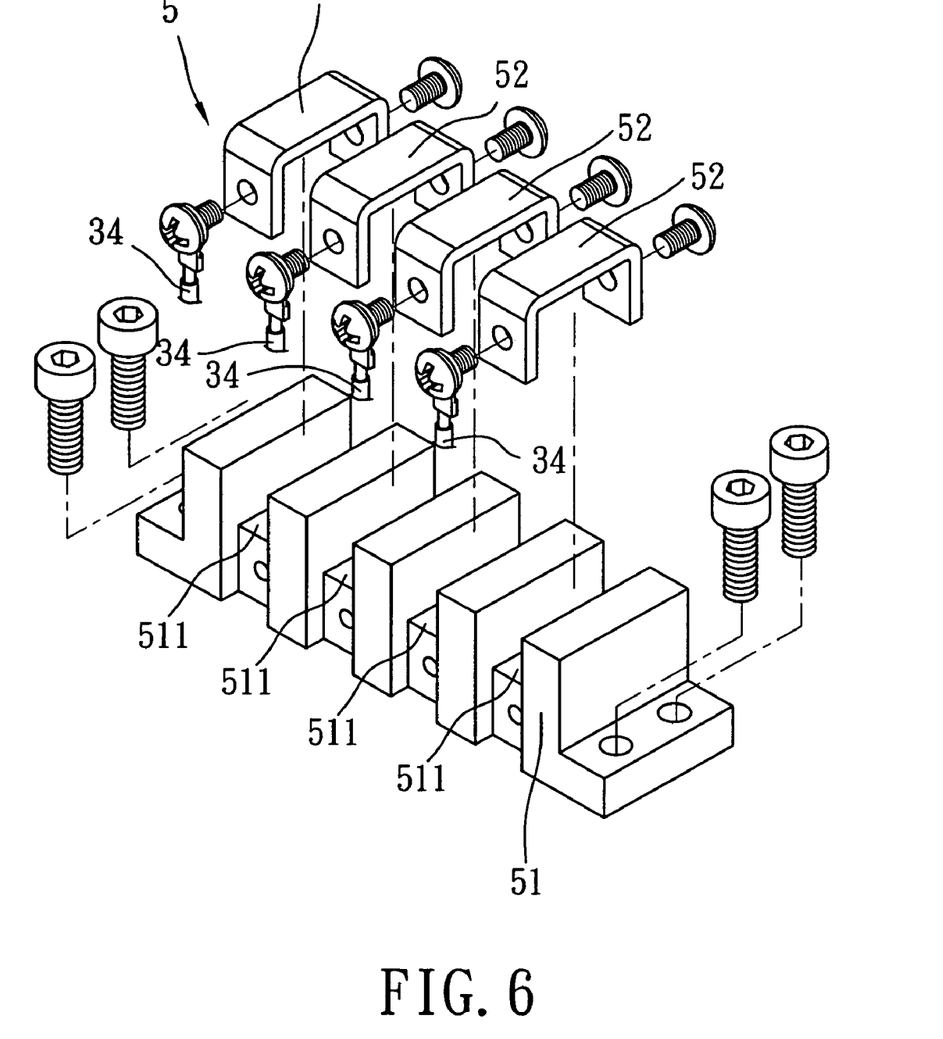
FIG. 6 is an exploded perspective view of a first electrical connector of the preferred embodiment.
Figure 7:
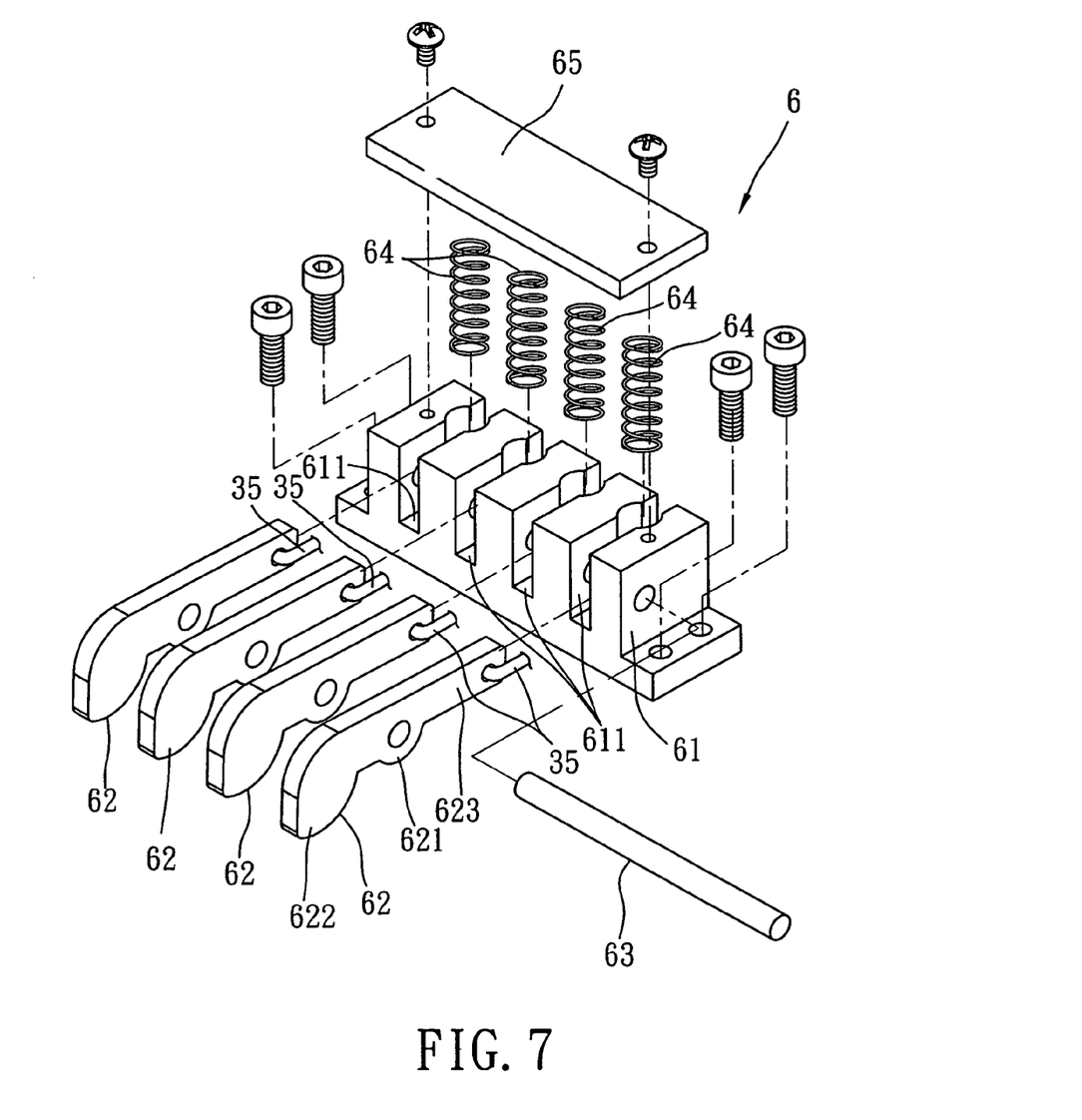
FIG. 7 is an exploded perspective view of a second electrical connector of the preferred embodiment.
Figure 8:
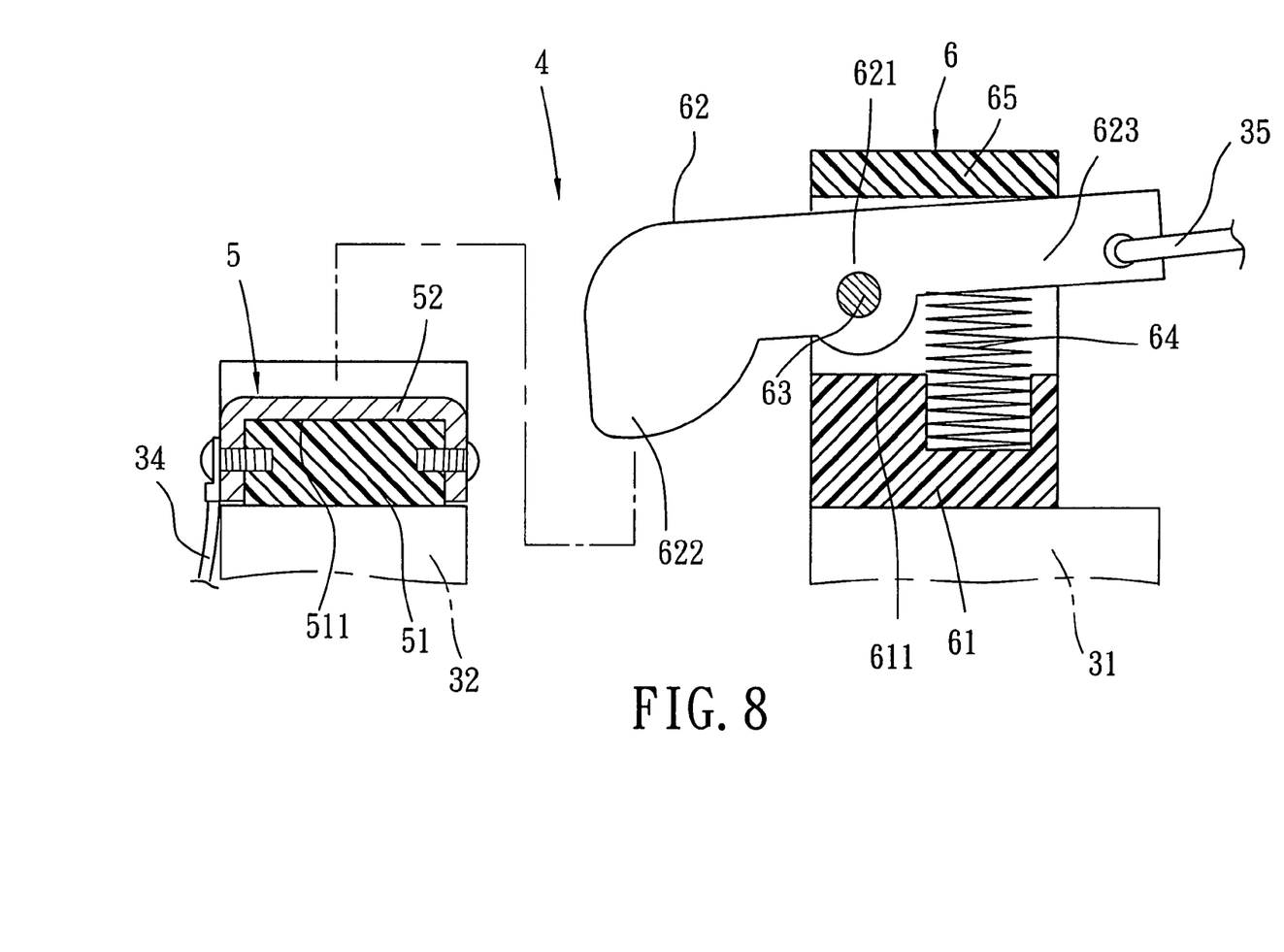
FIG. 8 is a schematic partly sectional view to illustrate a connection-breaking state of the first and second electrical connectors of the preferred embodiment.

With further reference to FIGS. 6 to 8, the electrical connector assembly 4 comprises a first electrical connector 5 and a second electrical connector 6.

The first electrical connector 5 includes a first insulator seat 51 to be mounted on the first component 32, and a plurality of first contacts 52 mounted on the first insulator seat 51 and spaced apart from each other. The first insulator seat 51 is made of an electrical insulating material, such as wood, plastic, etc., and has a top side formed with a plurality of first contact-receiving slots 511, each of which has a corresponding one of the first contacts 52 retained therein. In this embodiment, each of the first contacts 52 is formed as a metal plate having good electrical conductivity, and is adapted to be coupled electrically to a respective one of the first conductors 34.

The second electrical connector 6 includes a second insulator seat 61 to be mounted on the second component 31 at a position corresponding to that of the first insulator seat 51 on the first component 32, and a plurality of second contacts 62 mounted pivotally on the second insulator seat 61 and spaced apart from each other. In this embodiment, a pivot axle 63 mounts pivotally the second contacts 62 on the second insulator seat 61. A biasing unit, in the form of coiled compression springs 64, urges the second contacts 62 to pivot in order to establish tight contact with the first contacts 52 in a manner to be described hereinafter. A limit member, in the form of a cover plate 65, limits the range of pivoting movement of the second contacts 62 on the second insulator seat 61.

The second insulator seat 61 is made of an electrical insulating material, such as wood, plastic, etc., and has a top side formed with a plurality of second contact-receiving slots 611 at positions corresponding to those of the first contact-receiving slots 511 in the first insulator seat 51. Each of the second contact-receiving slots 611 has a corresponding one of the second contacts 62 extending therein. In this embodiment, each of the second contacts 62 is formed as a metal plate having good electrical conductivity, and has a contact portion 622 for contacting a respective one of the first contacts 52 when the first and second components 32, 31 of the vehicle 3 are coupled together, a pivot portion 621 extending from the contact portion 622 and having the pivot axle 63 extending therethrough such that the second contact 62 can pivot about the pivot axle 63, and a biased portion 623 extending from the pivot portion 621 such that the contact portion 622 and the biased portion 623 are disposed on opposite sides of the pivot portion 621. The biased portion 623 of each of the second contacts 62 extends into the respective one of the second contact-receiving slots 611, is adapted to be coupled electrically to a respective one of the second conductors 35, and is acted upon by a respective one of the compression springs 64. In particular, each of the compression springs 64 is disposed between the biased portion 623 of the respective one of the second contacts 62 and the second insulator seat 61, thereby biasing the respective biased portion 623 away from the second insulator seat 61. The cover plate 65 is made of an electrical insulating material, such as wood, plastic, etc., and is mounted on the top side of the second insulator seat 61 to close an open side of the second contact-receiving slots 611, thereby limiting the range of pivoting movement of the second contacts 62 about the pivot axle 63.

Figure 9:
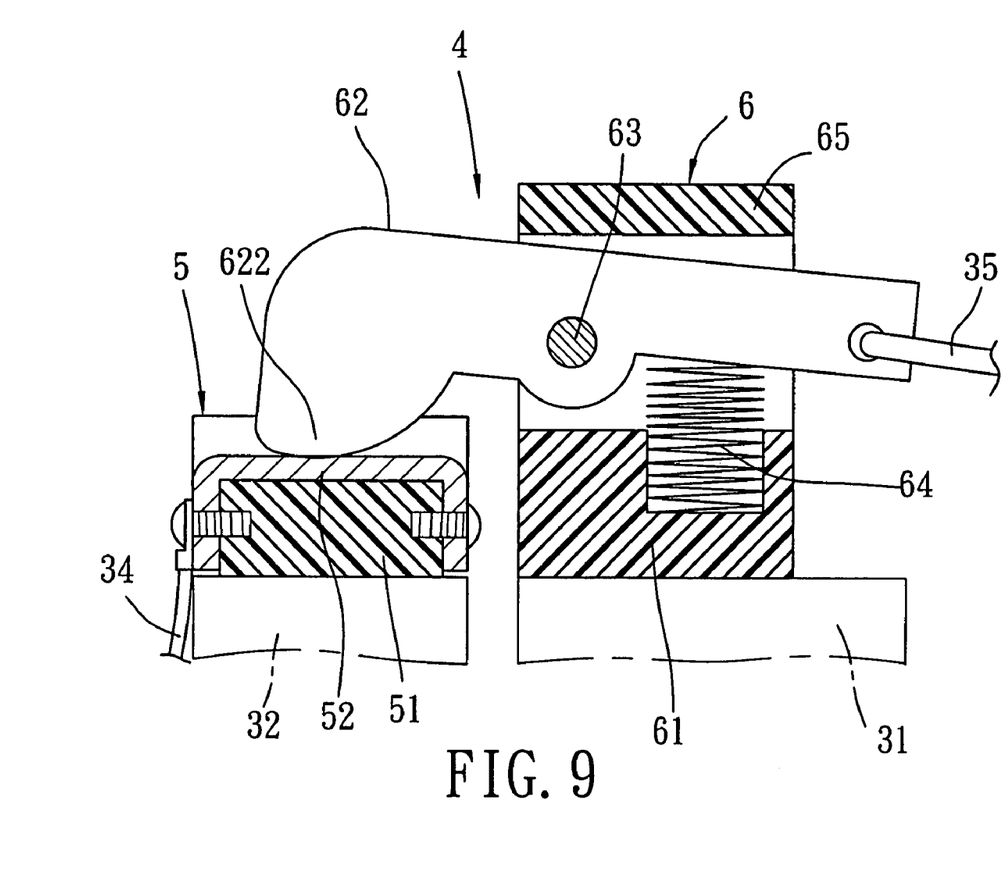
FIG. 9 is a schematic partly sectional view to illustrate a connection-making state of the first and second electrical connectors of the preferred embodiment.

As shown in FIGS. 4 and 9, when the first and second components 32, 31 of the vehicle 3 are coupled together, the contact portions 622 of the second contacts 62 are registered with the first contacts 52. Due to the biasing action of the compression springs 64, the second contacts 62 pivot about the pivot axle 63 in order for the contact portions 622 of the second contacts 62 to establish tight electrical contact with the first contacts 52, respectively, thereby establishing electrical connection between the first and second conductors 34, 35.

As shown in FIGS. 5 and 8, when the second component 31 is removed from the first component 32, the contact portions 622 of the second contacts 62 are moved away from the first contacts 52 so as to break the electrical connection between the first and second conductors 34, 35.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electrical connector assembly for a vehicle, the vehicle including a first component and a second component coupled removably to the first component, the first component being provided with a plurality of first conductors, the second component being provided with a plurality of second conductors, said electrical connector assembly being adapted to interconnect electrically the first and second conductors when the first component is coupled to the second component, said electrical connector assembly comprising:

a first electrical connector including a first insulator seat adapted to be mounted on the first component, and a plurality of first contacts mounted on said first insulator seat and spaced apart from each other, said first contacts being adapted to be coupled electrically and respectively to the first conductors; and a second electrical connector including a second insulator seat adapted to be mounted on the second component at a position corresponding to that of said first insulator seat on the first component, and a plurality of second contacts mounted pivotally on said second insulator seat and spaced apart from each other, said second contacts being adapted to be coupled electrically and respectively to the second conductors;

said second contacts being registered with and contacting electrically and respectively said first contacts so as to establish electrical connection between the first and second conductors when the first and second components are coupled together;

said second electrical connector further including a biasing unit for urging said second contacts to pivot in order to establish tight contact with said first contacts when the first and second components are coupled together;

said second contacts being moved away from said first contacts so as to break electrical connection between the first and second conductors when the second component is removed from the first component.

2. The electrical connector assembly as claimed in claim 1, wherein said second electrical connector further includes a limit member for limiting range of pivoting movement of said second contacts on said second insulator seat.

3. The electrical connector assembly as claimed in claim 1, wherein said second electrical connector further includes a pivot axle for mounting pivotally said second contacts on said second insulator seat.

4. The electrical connector assembly as claimed in claim 3, wherein each of said second contacts has a contact portion for contacting the respective one of said first contacts when the first and second components are coupled together, a pivot portion extending from said contact portion and having said pivot axle extending therethrough, and a biased portion extending from said pivot portion such that said contact portion and said biased portion are disposed on opposite sides of said pivot portion, said biased portion being acted upon by said biasing unit.

5. The electrical connector assembly as claimed in claim 4, wherein said biasing unit includes a plurality of compression springs, each of which biases said biased portion of a respective one of said second contacts away from said second insulator seat.

6. The electrical connector assembly as claimed in claim 5, wherein said second insulator seat is formed with a plurality of contact-receiving slots, said biased portion of each of said second contacts extending into a respective one of said contact-receiving slots.

7. The electrical connector assembly as claimed in claim 6, wherein said second electrical connector further includes a cover plate mounted on said second insulator seat to close an open side of said contact-receiving slots and to limit range of pivoting movement of said second contacts about said pivot axle.

8. The electrical connector assembly as claimed in claim 1, wherein:

said first insulator seat is formed with a plurality of first contact-receiving slots, each of which has a corresponding one of said first contacts retained therein;

said second insulator seat being formed with a plurality of second contact-receiving slots, each of which has a corresponding one of said second contacts extending therein.

* * * * *